United States Patent
Lewis

(10) Patent No.: US 7,018,582 B2
(45) Date of Patent: Mar. 28, 2006

(54) METHOD AND APPARATUS FOR FORMING AN ARTICLE AND AN ARTICLE FORMED THEREBY

(75) Inventor: Peter Joseph Lelievre Lewis, Queenstown (NZ)

(73) Assignee: Bale Fusion Limited, Queenstown (NZ)

( * ) Notice: Subject to any disclaimer, the term of this patent is extended or adjusted under 35 U.S.C. 154(b) by 0 days.

(21) Appl. No.: 10/275,367

(22) PCT Filed: May 4, 2001

(86) PCT No.: PCT/NZ01/00074

§ 371 (c)(1), (2), (4) Date: Apr. 11, 2003

(87) PCT Pub. No.: WO01/83186

PCT Pub. Date: Nov. 8, 2001

(65) Prior Publication Data

US 2003/0157297 A1    Aug. 21, 2003

(30) Foreign Application Priority Data

May 4, 2000    (NZ) ..................................... 504350

(51) Int. Cl.
*B29C 43/02*    (2006.01)

(52) U.S. Cl. .................... 264/460; 264/115; 264/120; 264/122; 264/911; 264/914

(58) Field of Classification Search ................ 264/115, 264/120, 122, 911, 914, 460–462
See application file for complete search history.

(56) References Cited

U.S. PATENT DOCUMENTS

| | | | | |
|---|---|---|---|---|
| 3,891,738 A | * | 6/1975 | Shen | .......................... 264/101 |
| 3,941,528 A | | 3/1976 | Cotterell | .................... 425/4 R |
| 5,032,327 A | | 7/1991 | Becheret | |
| 5,075,057 A | * | 12/1991 | Hoedl | ....................... 264/115 |
| 5,190,088 A | | 3/1993 | Thomassen et al. | ........ 144/361 |
| 5,236,655 A | | 8/1993 | de Soet | ...................... 264/320 |
| 5,263,841 A | | 11/1993 | De Soet | ...................... 425/384 |
| 5,316,708 A | | 5/1994 | Drews | ........................ 264/40.5 |
| 5,411,697 A | * | 5/1995 | McGraw et al. | ............. 264/294 |
| 5,472,997 A | | 12/1995 | Koslowski et al. | ......... 523/307 |
| 5,494,626 A | * | 2/1996 | Middleton | ................... 264/115 |
| 5,494,627 A | * | 2/1996 | Kargol et al. | ............... 264/119 |
| 5,569,425 A | * | 10/1996 | Gill et al. | .................... 264/121 |

(Continued)

FOREIGN PATENT DOCUMENTS

DE    42 44 535    7/1994

(Continued)

Primary Examiner—Mary Lynn Theisen
(74) Attorney, Agent, or Firm—Merchant & Gould P.C.

(57) ABSTRACT

A method for forming an article in which thermoplastics materials are used as the binding agent. Materials (21) are shredded in a shredder (1), compressed in a compressing chamber (15) and moulded in a moulding chamber (16, 17, 19, 20, 26, 27). The thermoplastics material is heated whilst the material is held under compression and then cooled to bind the material together. In one embodiment superheated steam is supplied via tubes (31) having apertures there along. In another embodiment superheated steam is supplied via apertures in side walls of the mould (58, 59). Blocks (62, 72) formed by the method and apparatus of the invention may find application as construction materials etc. and have good structural, thermal and acoustic properties.

49 Claims, 15 Drawing Sheets

U.S. PATENT DOCUMENTS

| | | | |
|---|---|---|---|
| 5,587,120 A | 12/1996 | Vieslet et al. | 264/118 |
| 5,824,246 A * | 10/1998 | Reetz | 264/122 |
| 6,344,165 B1 * | 2/2002 | Coleman | 264/517 |
| 6,409,269 B1 * | 6/2002 | Aebischer et al. | 297/452.55 |
| 6,605,245 B1 * | 8/2003 | Dubelsten et al. | 264/446 |
| 6,623,676 B1 * | 9/2003 | Davis et al. | 264/112 |
| 2001/0024727 A1 * | 9/2001 | Dubelsten et al. | 428/409 |

FOREIGN PATENT DOCUMENTS

| | | |
|---|---|---|
| DE | 299 01 641 | 7/2000 |
| FR | 2 570 978 | 4/1986 |
| JP | 9-300347 | 11/1997 |
| JP | 10-193358 | 7/1998 |
| JP | 11-314075 | 11/1999 |

* cited by examiner

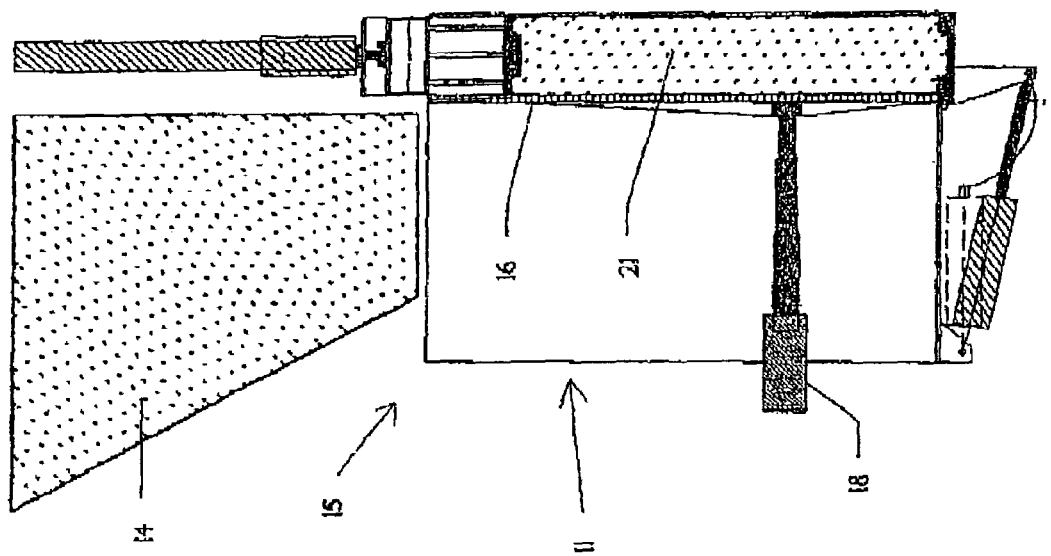
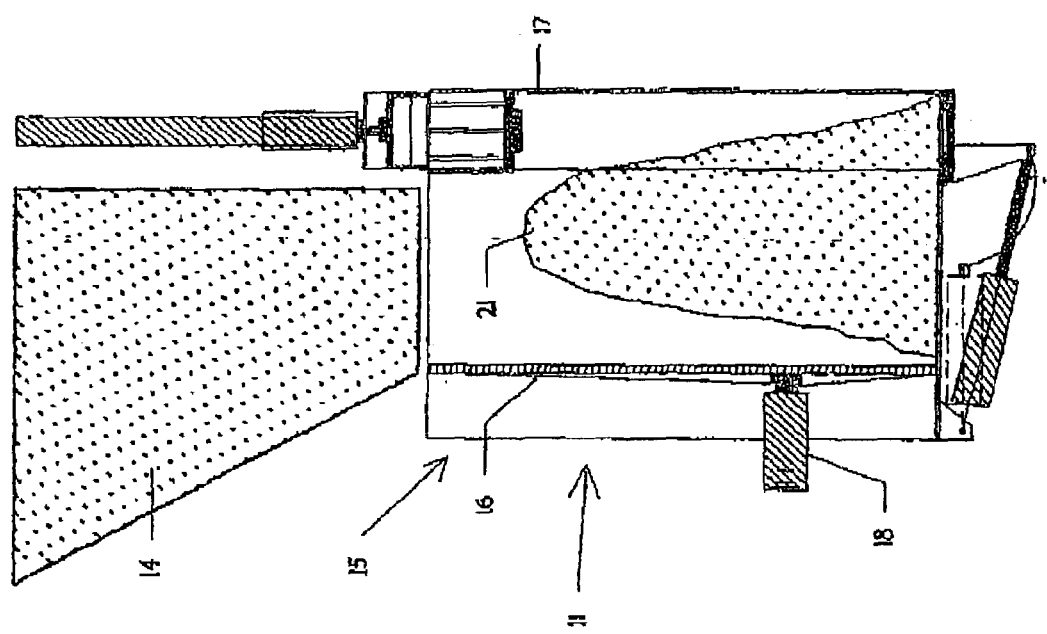

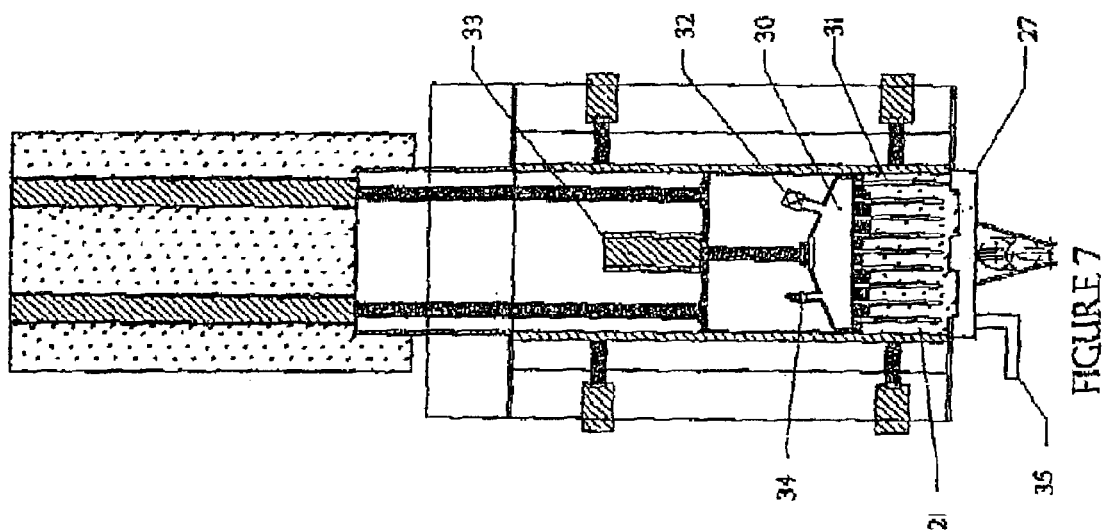
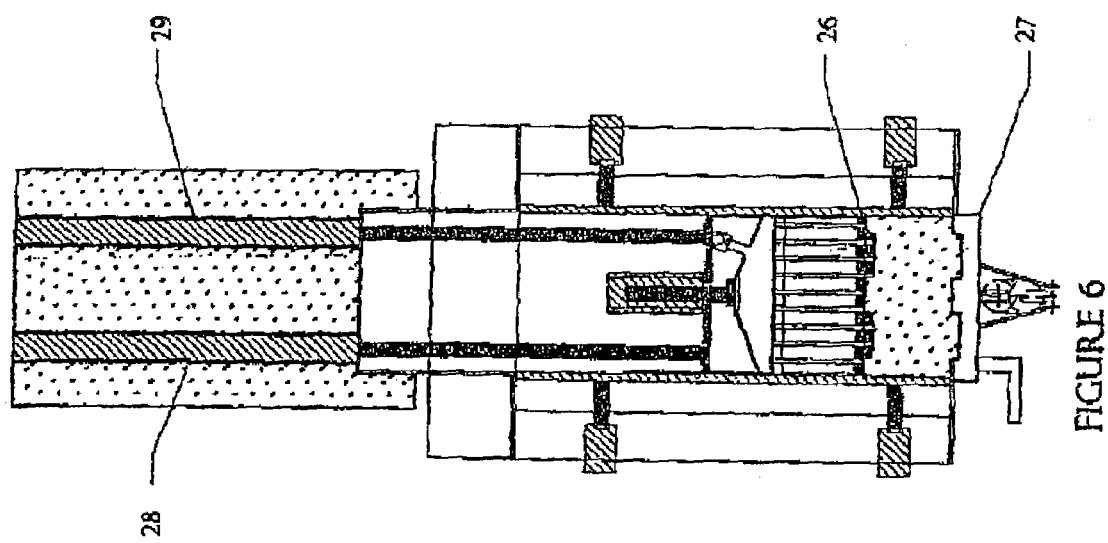

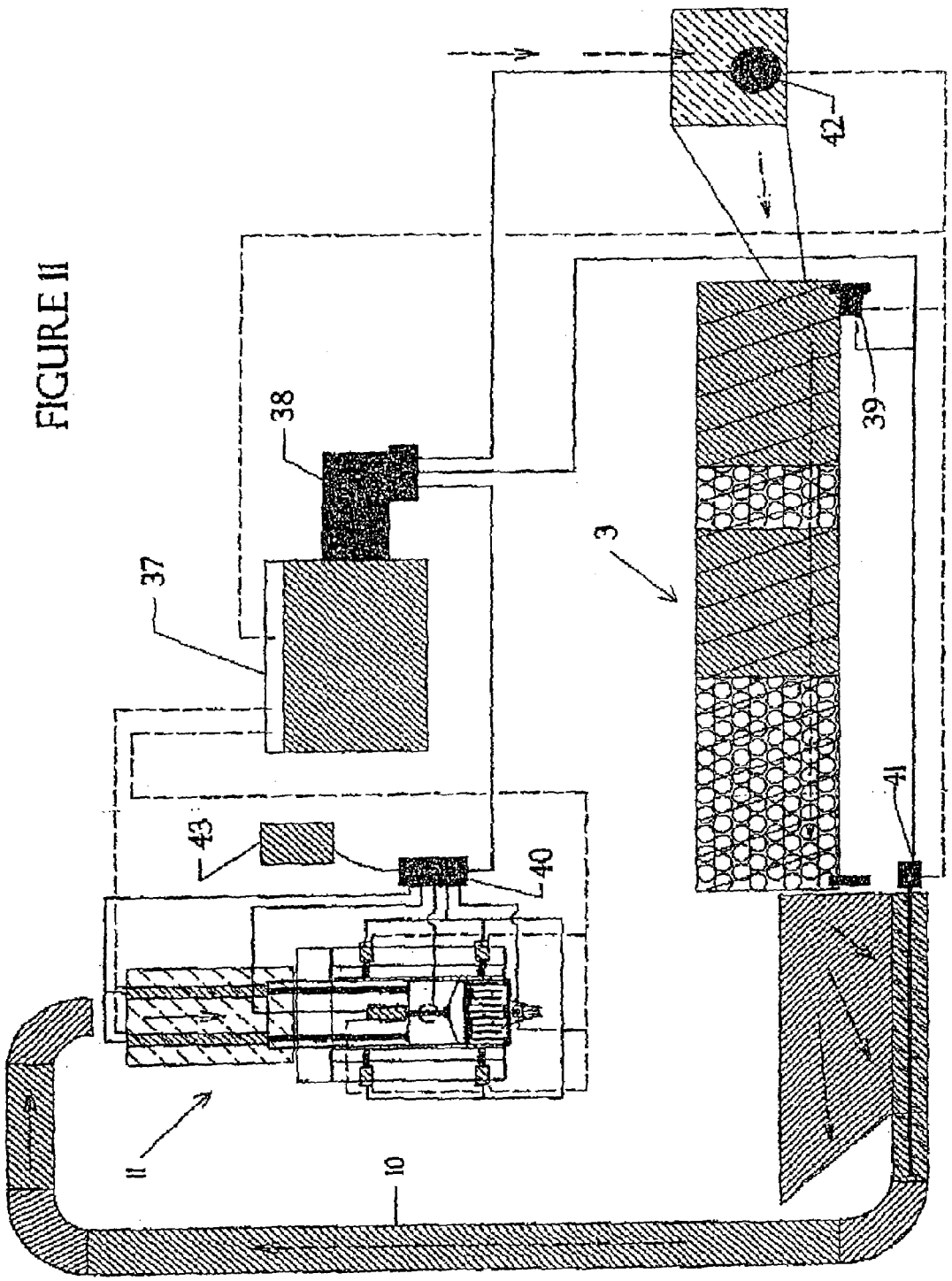

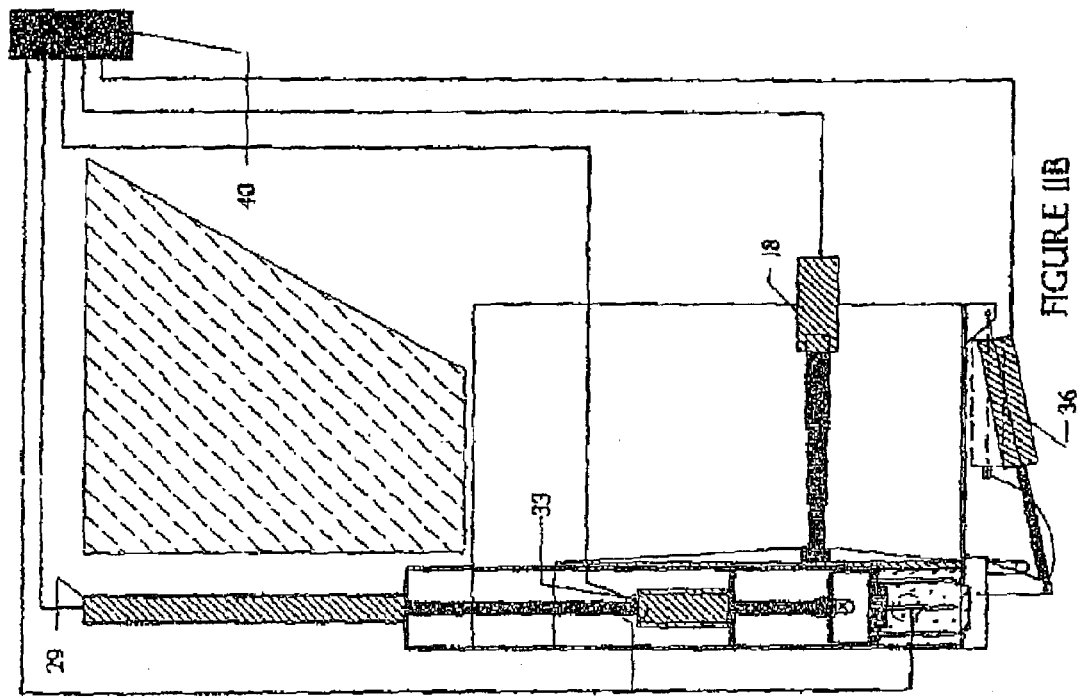
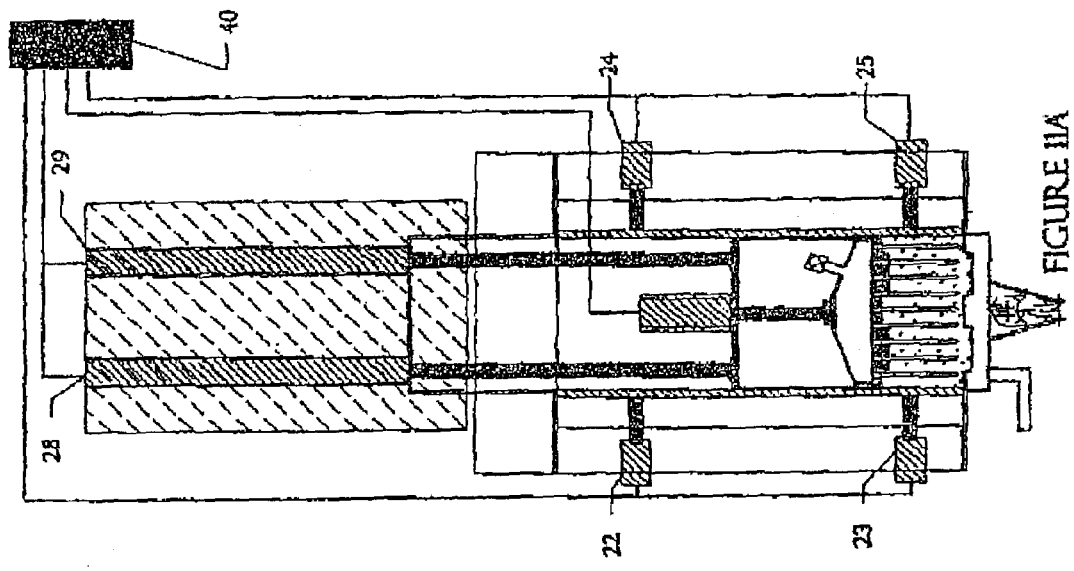

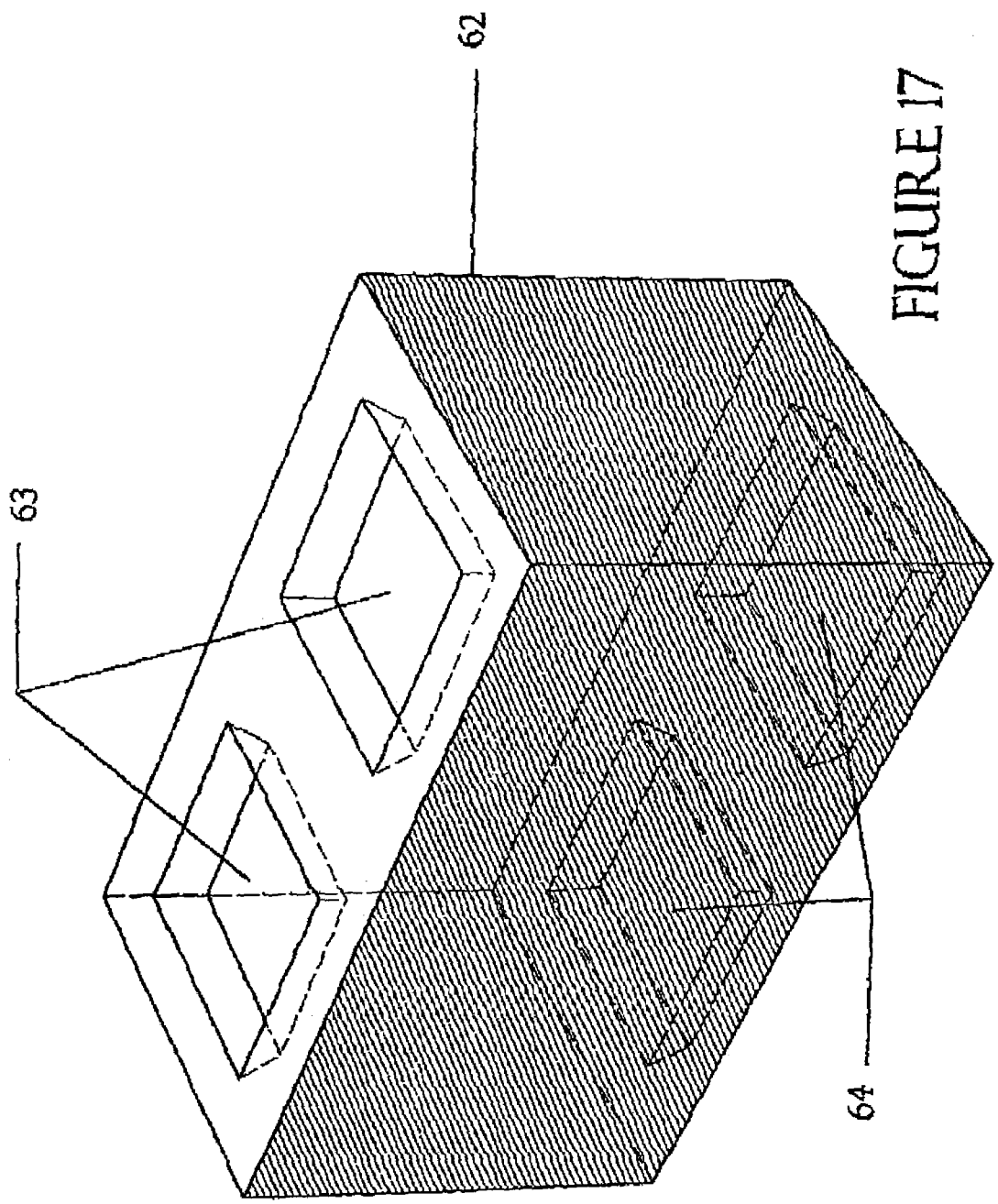

METHOD AND APPARATUS FOR FORMING AN ARTICLE AND AN ARTICLE FORMED THEREBY

FIELD OF THE INVENTION

The present invention relates to a method and apparatus for forming an article in which thermoplastics materials are used as the binding agent. The invention also relates to an article formed by the method or apparatus.

BACKGROUND OF THE INVENTION

A major challenge facing developed nations is dealing with the volumes of waste produced. Efforts have been made, in particular, in relation to the recycling of plastics and paper waste. Approaches to the recycling of plastics have focused upon processes where plastics are sorted into the various types and controlled proportions are utilised to produce recycled products.

A report entitled "Assessing the potential for post-use plastics waste recycling—predicting recovery in 2001 and 2006" produced by the Association of Plastics Manufacturers in Europe identified the main constraints for improving recycling rates for plastic as:

i/ the imbalance between the waste collectable and the potential end-markets for the recycled plastics ii/ the presence of large quantities of mixed plastics waste where the difficulties and energy consumed in separating into homogenous fractions and cleaning outweigh the environmental gain of mechanical recycling.

The report considered there to be an upper limit to potential demand for mechanically recycled plastics. This report reflects the common mind set of those in the industry that tightly control sorting is required to produce a valuable product. It also reflects the commonly held perception that there is a limited marked for the types of articles that may be produced.

In the report "SIRA International (1999). *Australian Plastics Materials Recycling Survey—Report for Plastics and Chemicals Industries Association*. Canberra, Australia" the major problems facing recyclars were identified as:

Separation of difficult plastics
Contamination between polymers
Contaminated waste
Plastics re-processing is highly labour intensive for low returns
Demand is unbalanced with supply
Not enough end users
Collection and separation Plastic recyclers currently recycle plastics into seven types as follows:

Code 1: Polyethylene Terephthalate (PET or PETE)
Code 2: High Density Polyethylene (HOPE)
Code 3: Vinyl (Polyvinyl Chloride or PVC)
Code 4: Low Density Polyethylene (LOPE)
Code 5: Polypropylene (PP)
Code 6: Polystyrene (PS)
Code 7: Other Tightly controlled sorting is expensive and is a significant cost component in current recycling processes. Where tightly controlled sorting has been required it has been difficult to produce a marketable product economically. The characteristics of many products produced in such recycling processes have been considered to be inferior.

There has also been a prejudice against the use of polyethylene film in recycling processes. In "Siegler, T. & Perkins, R. (1999). *Sorting Plastic Bottles for Recycling*. Ascotney, Vermont: DSM Environmental Services for The American Plastics Council" the following points were noted:

"Acceptance of even small amounts of recyclables in plastic bags will significantly reduce equipment efficiency unless all of the film is removed with a film removal system at the front end."and "The composition of material delivered to the MRF (materials recovery facility) has a significant impact on processing efficiency. Contaminants entering MRFs 5, 6, and 7 represented between 3.7% and 6.7% of the incoming material. This seemingly small amount of incoming contamination was responsible for between 31 and 67% of sorting labour at these the MRFs."and "Increased public education is necessary to better inform participating households which plastic containers are acceptable in the recycling program."

Rathje, W and Murphy, C. cite as one of the "Five Major Myths about Garbage and Why They're Wrong" that:

"The biggest problem faced by recycling is not the technological process of turning one thing into another. Anything can be recycled—and would be if demand for what it could be recycled into were great enough. The key, then, is demand, and demand for many recyclables is often soft."

To date the most commercially attractive recycling progresses have been those utilising industrial waste. Industrial waste may typically consist of large batches of one type of plastics which avoids the need for any sorting process.

OBJECT AND STATEMENT OF THE INVENTION

It is an object of the present invention to provide a method and apparatus for forming an article from mixed plastics waste which overcomes these problems or at least provides the public with the useful choice.

According to a first aspect to the invention there is thus provided a method of forming an article comprising the steps of:

i/ introducing into a chamber material to be formed containing a sufficient amount of thermoplastics material to bind the material together;

ii/ compressing the material within the chamber so that it occupies a reduced volume;

iii/ generating sufficient steam within the chamber to melt sufficient thermoplastics material substantially throughout the material to bind the material together when cooled; and iv/ releasing an article produced from the chamber.

The energy source may be superheated steam, a microwave energy source or en ultrasonic energy source. The material is preferably a mixture of shredded thermoplastics and other materials. The material is preferably compressed in a first direction and then in a second direction transverse to the first direction. The material may be further compressed in a third direction transverse to the first and second directions. The article formed may either be cooled within the chamber by liquid or air or released into a cooling medium.

According to a further aspect to the invention there is provided a method of forming an article comprising the steps of:

i/ introducing into a chamber material to be formed containing a sufficient amount of thermoplastics material to bind the material together when cooled;

ii/ compressing the material within the chamber so that it occupies a reduced volume;

iii/ introducing sufficient superheated steam into the receptacle to melt sufficient thermoplastics material to bind the material together substantially throughout the material; and iv/ releasing an article produced from the chamber.

The material is preferably compressed in a first direction and then in a second direction transverse to the first direction. The material may be further compressed in the third direction transverse to the first and second directions.

The material is preferably a mixture of shredded thermoplastics and other materials. Superheated steam is preferably introduced into the chamber either by apertures in one or more side of the chamber or via tubes inserted into the chamber when steam is introduced. The temperature of the superheated steam is preferably between 200° C. to 400° C., more preferably 260° C. to 320° C., most preferably 280° C. to 300° C. The pressure maintained within a chamber is preferably between 5 to 100 psi, more preferably 5 to 60 psi, most preferably 10 to 20 psi. Superheated steam is preferably introduced into the mould for a period of between 10 seconds to 5 minutes, preferably 10 to 60 seconds, most preferably 10 to 20 seconds. Where the temperature is hold constant at about 300° C. and supplied for a period of about 15 seconds the pressure maintained within a chamber is preferably between 5 to 26 psi, more preferably 5 to 20 psi, most preferably 10 to 15 psi. Where the temperature of the superheated steam is about 300° C. and the pressure is maintained at about 15 psi the superheated steam is preferably supplied for a period of between 10 to 16 seconds. The material is preferably reduced in volume by factor of between 5:1 to 25:1, more preferably by factor of between 10:1 to 20:1. The material may include up to 20% non-thermoplastic material, preferably up to 10% non-thermoplastic material.

According to a further aspect to the invention there is provided an article forming apparatus including:

a moulding chamber for receiving and containing compressed material including thermoplastics material; and outlets for providing superheated steam into the chamber positioned to provide sufficient heat substantially throughout the material within the chamber to melt the thermoplastics substantially throughout the material.

The outlets may be in the form of apertures in one or more face of the moulding chamber or in the form of one or more tube having apertures for providing a relatively even distribution of superheated steam throughout the chamber. The apparatus may include a compressing chamber for compressing the material prior to moulding. One pair of walls may move together in a first direction, a second pair of walls may move together in a second direction, transverse to the first direction, and a third pair of walls may move together in a third direction transverse to the first and second directions. The moulding chamber is preferably defined by the first, second and third pairs of walls when moved together.

According to a further aspect to the invention there is provided an article forming apparatus including:

a compressing chamber for receiving material and compressing it in at least two transverse directions to a reduced volume; a moulding chamber for containing the compressed material; and a microwave source for supplying microwave radiation substantially throughout the moulding chamber.

BRIEF DESCRIPTION OF THE DRAWINGS

The invention will now be described by the way of example with reference to the accompanying drawings in which:

FIG. 2: is a cross sectional side view of the article forming apparatus with material to be formed loaded in the compression chamber.

FIG. 3: shows a cross sectional side view of the article forming apparatus after a first stage of compaction.

FIG. 6: shows a front cross sectional view of the apparatus after a third stage of compression has been performed.

FIG. 7: shows a front cross sectional view of the apparatus when steam injection tubes have been inserted into the moulding chamber.

FIG. 11: shows the hydraulic circuit for the system of FIGS. 1 to 10.

FIGS. 11A and B: show front and side cross sectional views of the hydraulic circuit of the article forming apparatus.

FIG. 17: shows an article in the form of a block produced by any one of the article forming apparatus of FIGS. 1 to 16.

DETAILED DESCRIPTION OF PREFERRED EMBODIMENT

Figure 1:
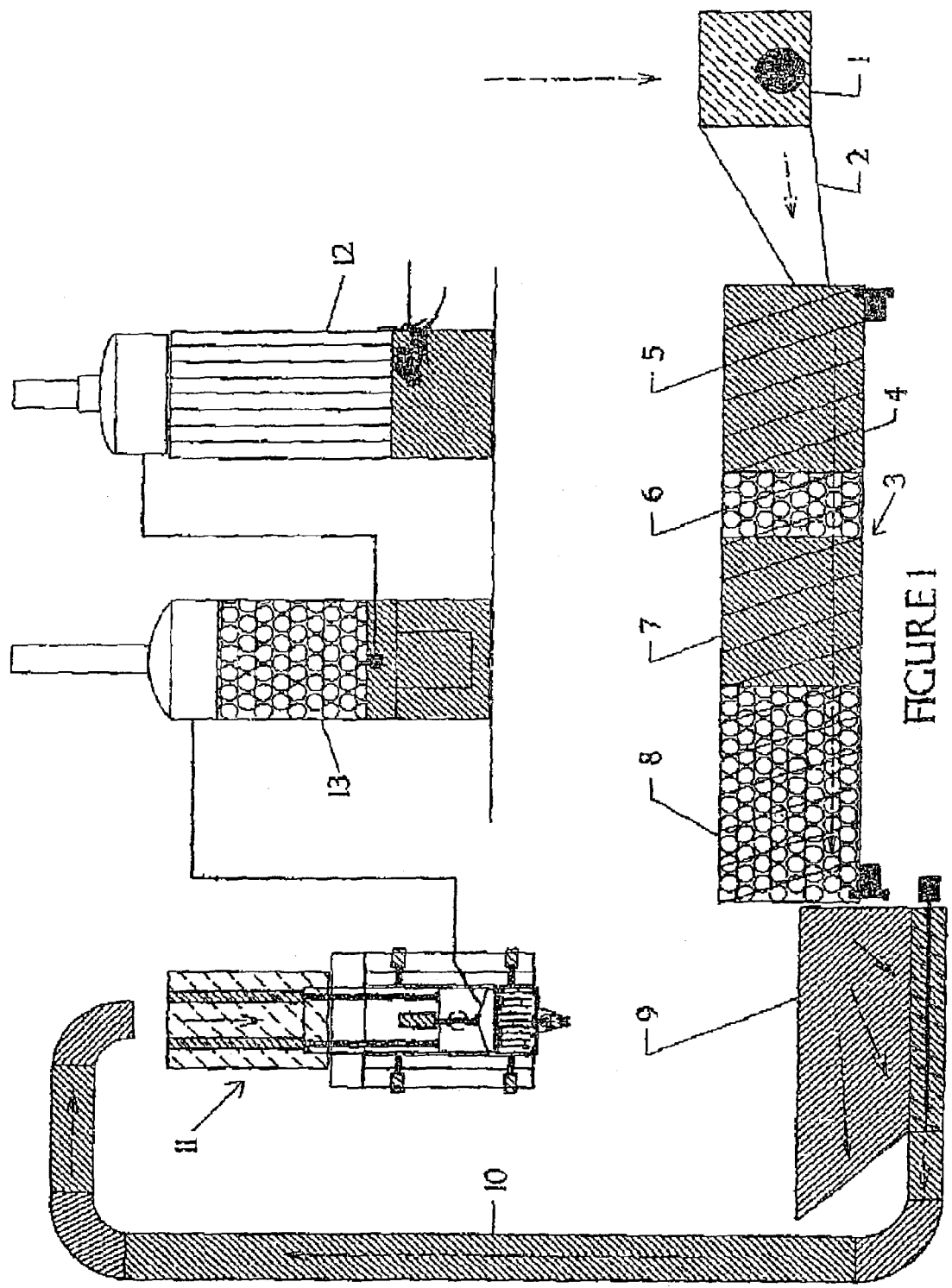
FIG. 1: is a schematic diagram of an article forming system according to a first embodiment to the invention.

Referring firstly to FIG. 1 a schematic diagram of a system for forming an article according to a first embodiment will be described. Material to be processed is supplied to shredder 1. The material provided to shredder 1 includes a sufficient proportion of thermoplastic material to bind the article together when processed. Preferably, the material is waste plastic material. Mixed waste plastic material may be provided in a substantially unsorted state. Sorting into plastics types will generally not be required for normal mixtures of domestic waste. Some sorting may be desirable to exclude undesirable non plastics materials included within the waste such as large non-plastic items or expanded polystyrene. Preferably greater than 80% and more preferably greater than 90% of the material consists of plastics material.

Shredder 1 preferably shreds the material into strips. A suitable shredder is a PT 45 shredder produced by Peak Technology Limited of Wellington New Zealand. The material is preferably shredded into strips of between 10 to 20 mm in width, most preferably about 16 mm in width. There will be a certain degree of variation in strip width due to the shredding process and a certain degree of roughness of the edge of the shredded material may be advantageous as discussed later.

As well as plastics materials certain other materials such as sawdust, wood chip, paper or other fibres may be added up to an amount of about 20% although preferably less than 10%.

The shredded material is fed by feed-hopper 2 into a washing and drying drum 3. An auger 5 is provided along the length of the drum to feed material through the drum as it is rotated. In first stage 4 water is sprayed upon the shredded material as it passes through the first stage and auger 5 advances the material through the drum to a perforated drying section 6. In a second rinse stage 7 the shredded material is again sprayed with hot water and auger 5 advances the shredded material through section 7 into drying section 8. Prying section 8 has large perforations which allow water to drain from the shredded material. Residual heat retained by the material after being heated by the hot rinse water facilitates drying of the material. The entire drum 3 is rotated via an hydraulic or an electric motor.

Shredded material from drying section 8 is fed to accumulator 9 and fad by auger or conveyor 10 to article forming apparatus 11. Boller 12 provides steam to superheater 13 which provides superheated steam to article forming apparatus 11.

Referring now to FIG. 2 a side cross sectional view of an article forming apparatus according to a first embodiment is shown. A feed-hopper 14 supplies shredded material to a compressing chamber 15. Compressing chamber 15 consists of three pairs of walls that may be moved together to compress the material therein. A first pair of walls 16 and 17 are shown in FIG. 2. Wall 17 is fixed in this case and wall may 16 may be moved towards wall 17 upon extension of ram 18. Once ram 18 is extended wall 16 moves to the position shown in FIG. 3.

Figure 5:
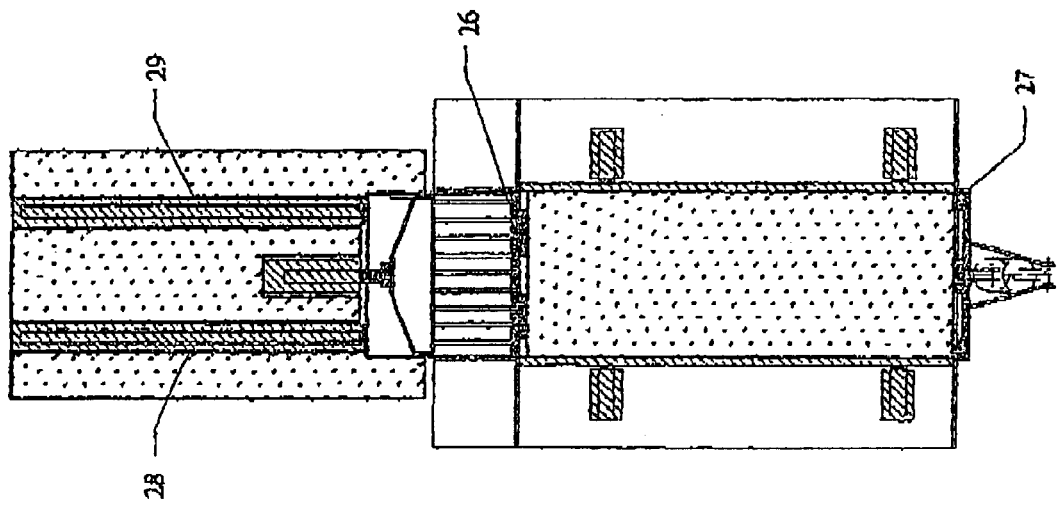
FIG. 5: shows a front cross sectional view of the article forming apparatus after a second stage of compression.
Figure 4:
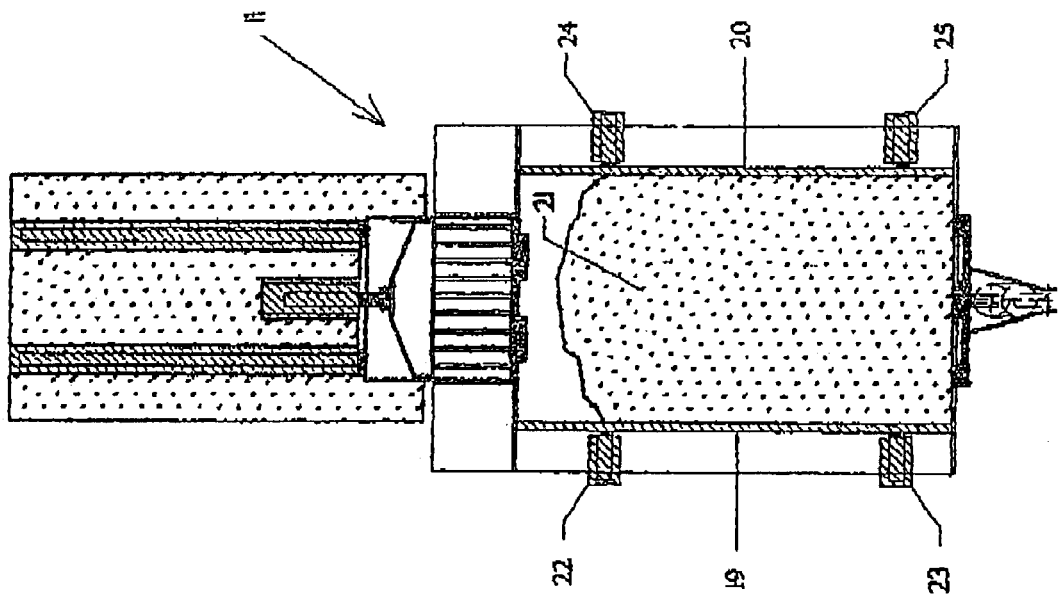
FIG. 4: shows a front cross sectional view of the article forming apparatus.
Figure 8:
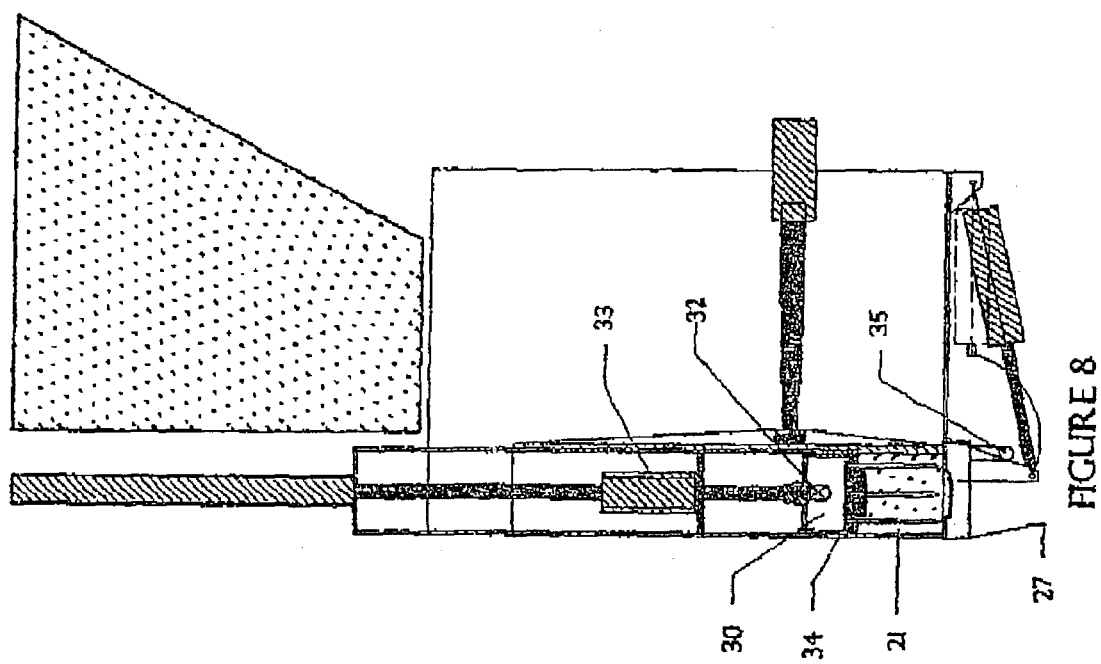
FIG. 8: shows a side cross sectional view of the article forming apparatus as shown in FIG. 7.

Referring now to FIG. 4 a front cross sectional view of apparatus 11 is shown. In this view side walls 19 and 20 are seen to contain shredded material 21 there between after walls 16 and 17 have been moved together in a second stage of compression rams 22 to 25 are extended to move walls 19 and 20 to the position shown in FIG. 5. As shown in FIG. 5 the shredded material 21 has undergone compression in a first direction and then a second direction transverse to the first direction. Moving two wails together in the second compressing stage assists in evening the stock of compressed material.

In a third stage of compression walls 26 and 27 are moved together. Rams 28 and 29 are extended to move walls 26 and 27 together to the position shown in FIG. 6. The material has then undergone compression in a third direction transverse to the first and second directions of the prior compression stages.

Compressing the shredded material in one direction and at least a further direction transverse to the first direction is considered to be advantageous. Compressing the material in a single direction can result in alignment of strips. Compressing the material in transverse direction assists in producing a structure that is less aligned in any single direction. This process also assists in promoting interlocking of the rough edges of strips of material to assist in binding the material together. However, in some applications alignment of the strips could be desirable in which case compression in single direction could be used. The compressing chamber is preferably vertically elongate to minimise the footprint of the apparatus and to promote even distribution of material 21 (i.e. avoid peaking of material in the stack). Compression is preferably substantially equal in each stage (about 2.5:1 in each stage). Different densities of block may be formed by filling the compressing chamber with different weights of material.

After the three stages of compression the three pairs of wells 16 and 17, 19 end 20 and 25 and 27 have moved together to define a moulding chamber containing shredded material 21. Although in this embodiment the moulding chamber is formed as part of the compressing chamber it will be appreciated that a separate moulding chamber and compressing chamber may be employed.

In the next step of the process sufficient energy must be provided to the moulding chamber to melt sufficient thermoplastics material within shredded material 21 so that, upon cooling, the material will be substantially bound together. Material 21 is saturated with heat energy to ensure a relatively consistent bonded matrix is formed. Polyethylene is a large component of typical domestic waste and has excellent adhesive properties as utilised in hot glue guns. Low density polyethylene is usually a difficult waste for recyclers to deal with and constitutes a large proportion of residential waste. Polyethylene may be melted front a crystalline form and upon cooling returns to a crystalline form. It is an effective binding agent in the method of the invention. Other low melting point thermoplastics may also be utilised to bind the material together.

In order to achieve an economic process producing a viable product, a sufficient amount of energy to melt the binding thermoplastics material substantially throughout the article must be provided within a relatively short time period. According to a first aspect to the invention superheated steam is introduced via tubes having apertures along their length so as to achieve heating of the thermoplastic material throughout the mould to provide effective binding.

Referring now to FIG. 7 the moulding stage according to the first aspect to the invention will be described. In FIG. 7 there is shown a manifold 30 having a plurality of tubes 31 extending therefrom. In this example tubes 31 have an outside diameter of 9.5 mm and a wall thickness of between 0.9 to 1.2 mm. 2 mm apertures are drilled through the tube at 25 mm spacings and the end of the tube is closed to form a pointed end. Superheated steam is input to manifold 30 via inlet 32 and output into tubes 31. Tubes 31 are distributed throughout the chamber during moulding and are provided with apertures at intervals along their length to provide superheated steam at a variety of locations throughout the moulding chamber. As shown in FIG. 7 ram 33 extends to insert tubes 31 through apertures in wall 26 into material 21. The moulding chamber is substantially sealed and the pressure within a chamber can be controlled via an adjustable relief valve 34. In this example the chamber is dimensioned to form a block of approximately 200 mm by 200 mm by 400 mm. Steam is introduced at a prescribed temperature and pressure for a predetermined period to ensure that the correct amount of energy is supplied to the material 21 at an appropriate rate.

The superheated steam preferably has a temperature within the manifold 30 of between 200° C. to 400° C., more preferably 260° C. to 320° C., most preferably 280° C. to 300° C. The pressure maintained within the moulding chamber is preferably between 5 to 100 psi, more preferably 5 to 60 psi and most preferably 10 to 20 psi. The period of supply of superheated steam to the moulding chamber is preferably to 10 sac to 5 min, more preferably 10 to 60 sec. most preferably 10 to 20 sec.

The objective is to provide sufficient heat throughout the mould to melt sufficient thermoplastics materials to effectively bind materials 21 together on cooling. The heat must be applied at an appropriate temperature and pressure to avoid degradation of the product and to make the process economic. Operating parameters will vary depending upon the materials concerned and the density of product to be formed. Certain preferred operating parameters have been determined for mixed waste plastics as follows.

One approach is to maintain temperature and period of supply of superheated steam substantially constant and to vary the pressure maintained within the moulding chamber. It has been found experimentally that good quality products can be achieved when the temperature of the superheated steam is maintained at about 300° C. and supplied for a period of about 15 sec. For a high density block (275 to 350 kg/m$^3$) the pressure is preferably maintained at between 15 to 25 psi. For medium density block (200 to 270 kg/m$^3$) the pressure is preferably maintained at between to 20 psi. For a low density product (between 100 to 200 kg/ma$^3$) the pressure is preferably maintained at between 5 to 15 psi. Different densities of block may be desirable for different applications such as structural blocks, acoustic blocks, thermal insulation etc. A manifold temperature of about 300° C. is advantageous as it is low enough not to degrade the material but high enough to deliver energy sufficiently quickly. This temperature is easily and economically achieved with a superheater. This temperature also allows the pressure to be kept relatively low. Use of a fixed cycle time means that prior and subsequent process steps are not affected by the type of article being produced.

Another approach is to maintain the temperature of the superheated steam constant at about 300° C. and the pressure constant at about 15 psi. In this case the period of supply of steam to the moulding chamber will typically vary between 10 to 20 sec. This will depend upon the materials utilised.

Referring again to FIG. 7 it will seen that venting is provided via variable pressure relief valve 34 at the top of the mould. It is preferable to provide venting at the top of the mould as the energy distribution from tubes 31 tends to have a pear shape distribution towards the bottom of the mould. By venting at the top, steam from the bottom travels through the top zone and results in more uniform heating of all materials in the block.

Once sufficient steam has been supplied to the moulding chamber manifold 30 and tubes 31 are retracted by ram 33. After a sufficient quantity of superheated steam has been supplied to a mould cooling water is introduced Via inlet 35. Any suitable cooling liquid or gas may be utilised although water is preferred. Cooling the article 21 formed in the mould has the advantage of fixing the article in the shape of the mould prior to ejecting it. However, article 21 may be ejected from the mould into a cooling fluid.

Figure 10:
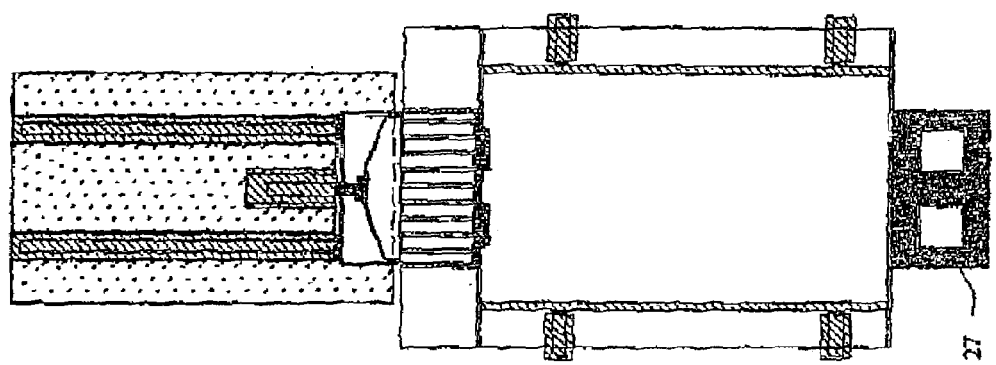
FIG. 10: shoes a front cross sectional view of the apparatus as shown in FIG. 9.
Figure 9:
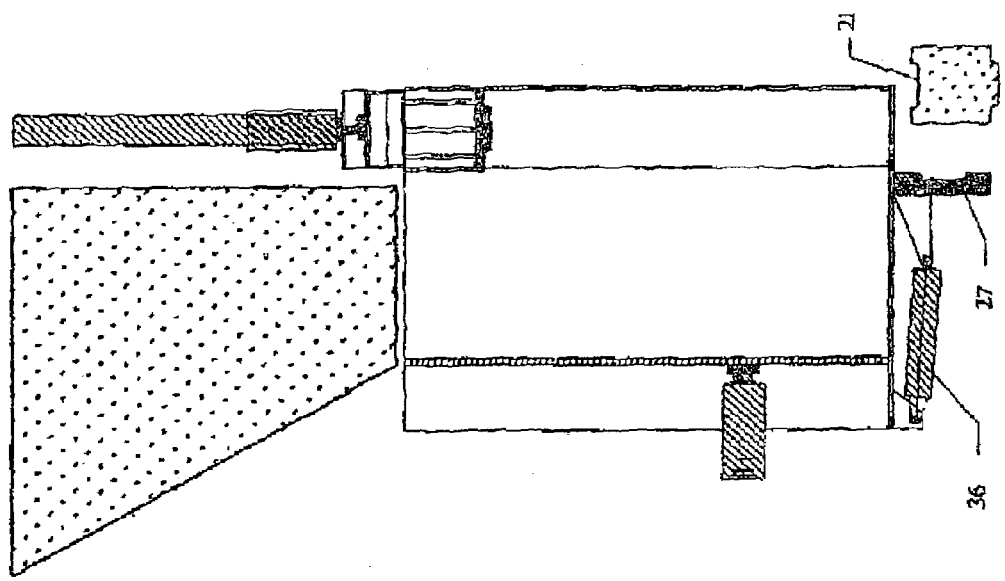
FIG. 9: shows a side cross sectional view of the article forming apparatus after a moulded article has been ejected.

Upon cooling of article 21 wall 27 may be rotated by ram 36 to allow a formed block 21 to be ejected from the moulding chamber as shown in FIGS. 9 and 10.

Referring now to FIG. 11 an hydraulic circuit for the system of FIGS. 1 to 10 is shown. An hydraulic tank 37 supplies hydraulic fluid to an hydraulic power source 38. This supplies hydraulic fluid to drive hydraulic motor 39 which rotates drum 3 Hydraulic power source 38 also provide hydraulic fluid to drive hydraulic motor 41 of conveyor 10. Hydraulic fluid is also supplied from power source 38 to shredder motor 42. Hydraulic fluid is returned via return lines (dashed lines) to hydraulic tank 37. Hydraulic power source 38 also provides pressurised hydraulic fluid to hydraulic controller 40 which supplies fluid to the rams of apparatus 11 under the control of programmable logic controller (PLC) 43, FIGS. 11A and 11B show the hydraulic circuit from hydraulic controller 40 to rams 18, 22 to 25, 28 and 29, 33 and 36. These are controlled to operate in the appropriate sequence by PLC 43.

Figure 12:
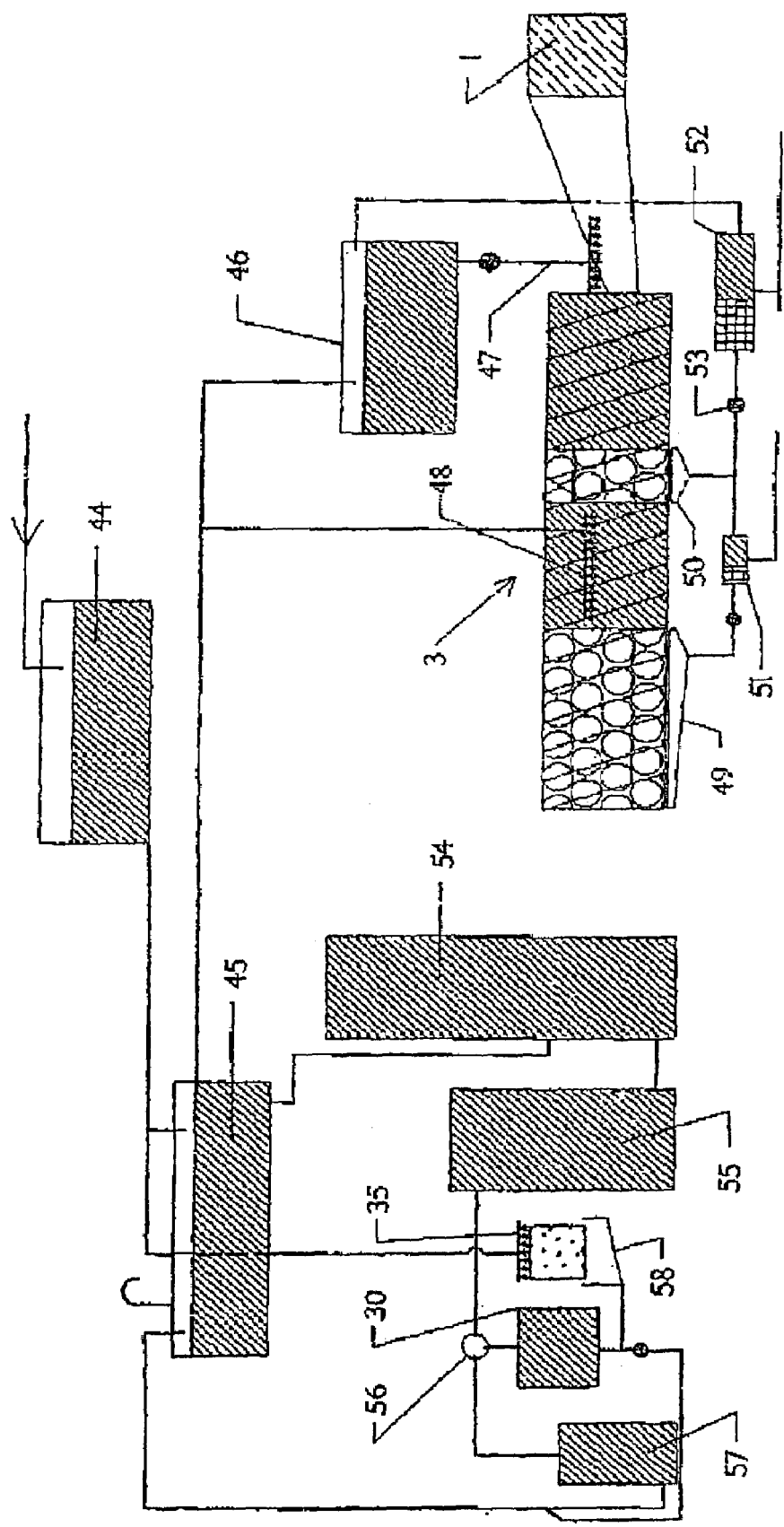
FIG. 12: shows a schematic diagram of a water circuit for the system of FIGS. 1 to 11.

Referring now to FIG. 12 a water circuit for the system of FIGS. 1 to 11B is shown. Clean water is supplied to water tank 44 which supplies water to hotwell tank 46. Hot water from hotwell tank 45 is supplied to washing tank 46. Washing tank 46 supplies hot water to sprayer 47 for the first wash of shredded material. Hot water for the second rinse is supplied from hotwell tank 45 to sprayer 48. Excess water from the two drying stages is collected in drip trays 49 and 50, is filtered by filters 51 and 52 and pumped by pump 53 back to washing tank 46. Although filtered, the water in washing tank will be of a lower quality than the other tanks and is suitable for the first wash cycle.

Water from hotwell tank 45 is also supplied to boiler 54. Boiler 54 supplies steam to superheater 55. Superheater 55 supplies superheated steam to three way valve 56 which supplies superheated steam to manifold 30 of apparatus 11 or to condenser 57 to be returned to hotwell tank 45. Cooling water to cool a moulded article is supplied to inlet 35 from hotwell tank 45. Water collected from drip tray 58 is returned to hotwell tank 45.

Figure 14:
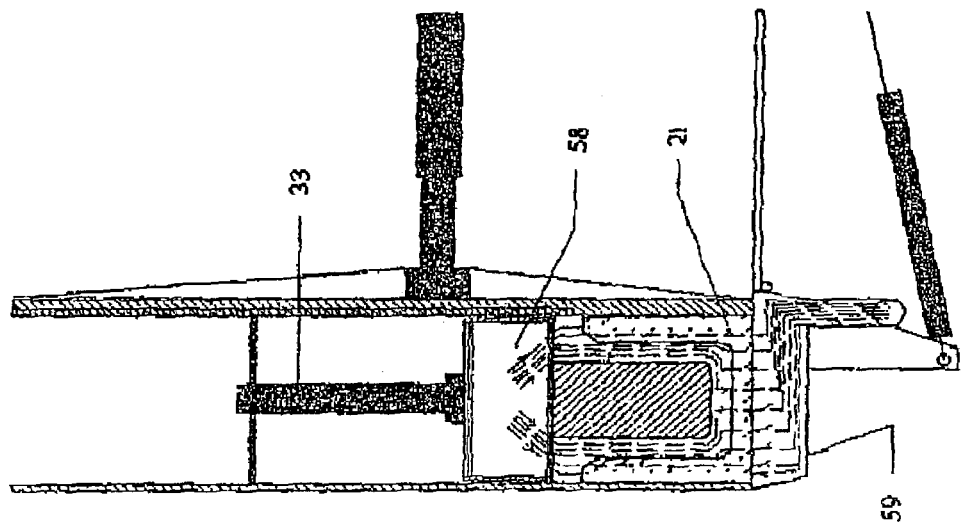
FIG. 14: shows a side cross sectional view of the article forming apparatus of FIG. 13.
Figure 13:
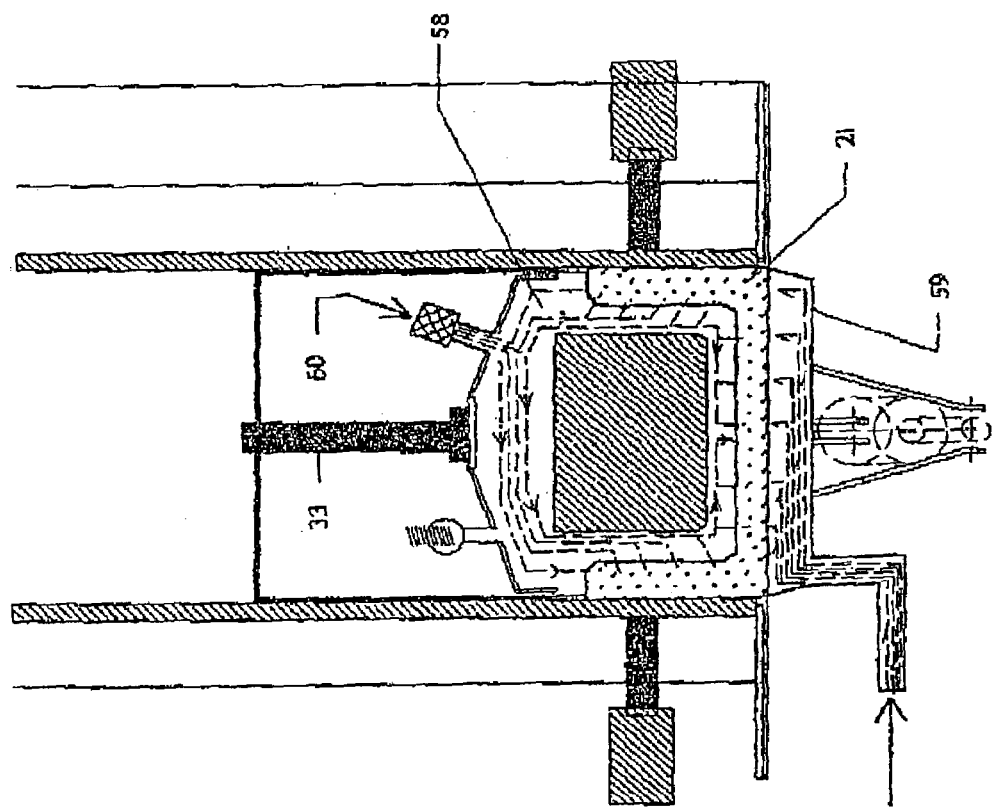
FIG. 13: shows a front cross sectional view of an article forming apparatus according to a second embodiment.
Figure 16:
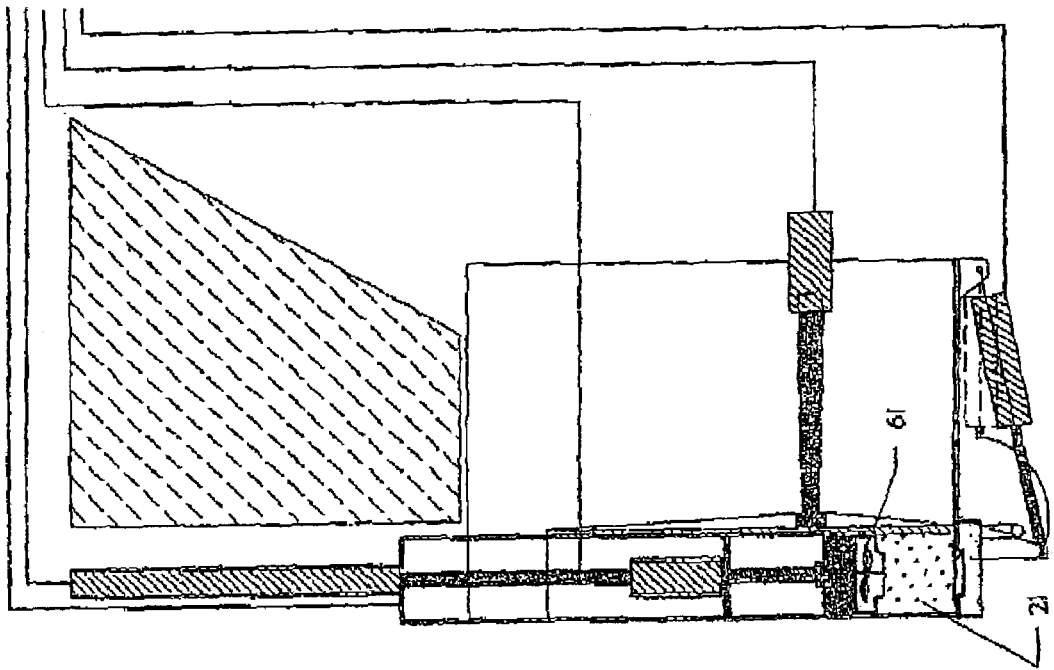
FIG. 16: shows a side cross sectional view of the article forming apparatus of FIG. 15.
Figure 15:
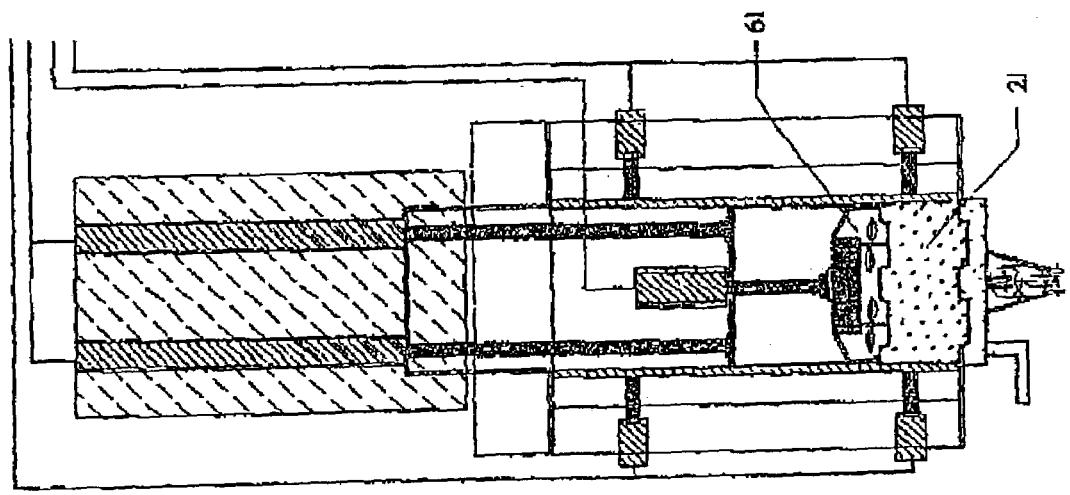
FIG. 15: shows a front cross sectional view of an article forming apparatus according to a third embodiment.

Referring now to FIGS. 13 and 14 an apparatus according to a second aspect of the invention is shown. In this case a relatively thin article is to be formed and superheated steam is supplied via side walls of the moulding chamber. The article forming apparatus is identical to the apparatus described above except that top wall 26 and manifold 30 are replaced by mould portion 58 and wall 27 is replaced by wall 59. In this case superheated steam is supplied via inlet 60 to an interior cavity of mould portion 58. Superheated steam from the interior cavity of mould portion 58 passes through a number of apertures adjacent the surface of mould portion 68 opposite material 21. Likewise, wall 59 has a cavity therein and apertures are provided in the face of wall 69 adjacent material 21 and are distributed so as to provide relatively uniform heating throughout material 21. This method is suitable where relatively thin articles are to be manufactured. Apart from the provision of steam via apertures rather than tubes operation is as per the embodiment shown in FIGS. 1 to 12, Referring now to FIGS. 15 and 16 a further alternative embodiment is shown which again is identical to apparatus 11 except that manifold 30 and needles 31 have been replaced by a microwave transmitter 61. In this case heating energy is supplied to wet material 21 by microwave radiation rather than through the use of superheated steam. In this case it is necessary to supply water to the moulding chamber and for the chamber to be sealed so that elevated pressures can be achieved. Water may be injected into the mould or wet material may be introduced. The microwave radiation heats the water to form superheated steam throughout the moulding chamber. Operation is otherwise identical to that described above. Other energy sources that can heat moisture throughout the moulding chamber may also be employed.

Figure 18:
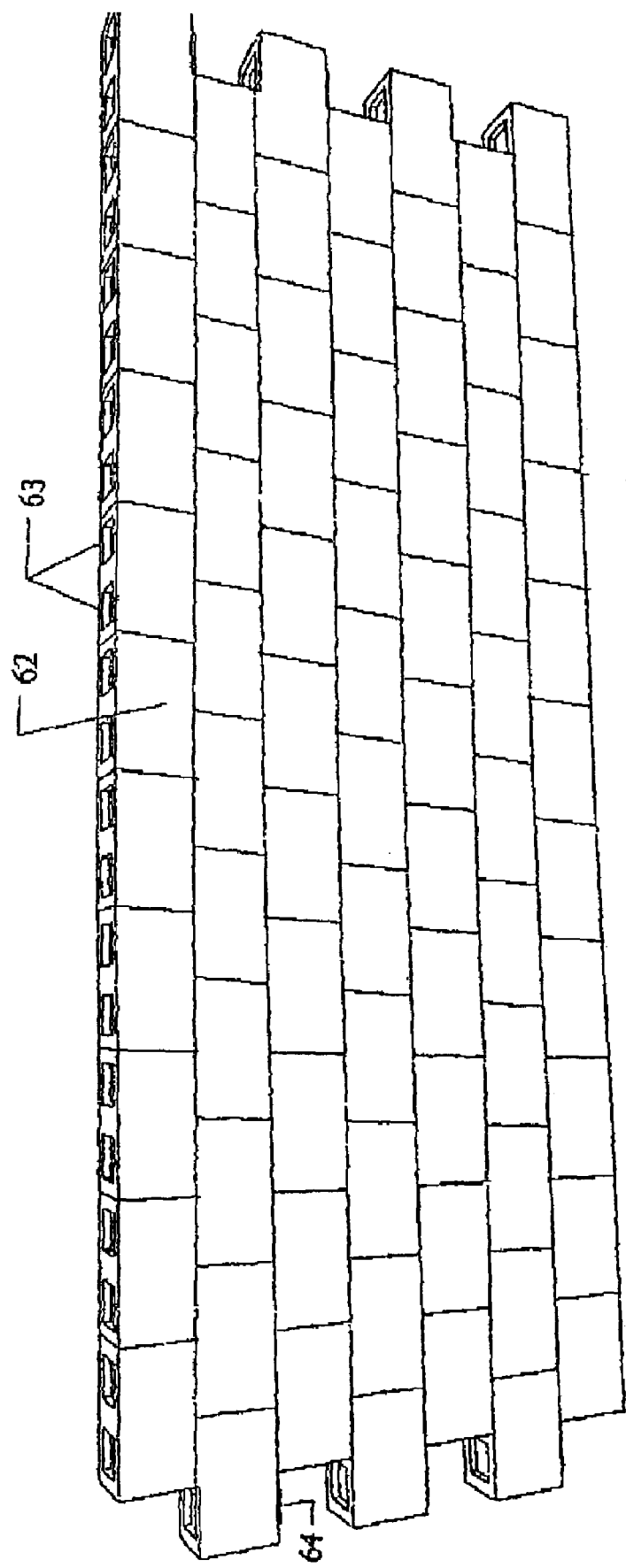
FIG. 18: shows a wail constructed of blocks of the type shown in FIG. 17.

Referring now to FIG. 17 an article in the form of a block formed by the apparatus of the invention is shown. In this case block 62 has recesses 63 formed in the one face and corresponding protrusions 64 formed an opposite face. The protrusions 64 may be engaged within corresponding recesses 63 of adjacent blocks when forming a wall as shown in FIG. 18 the protrusions 64 end recesses 63 help to locate blocks and maintain lateral stability. A block may of course be produced not having projections or recesses.

Figure 19:
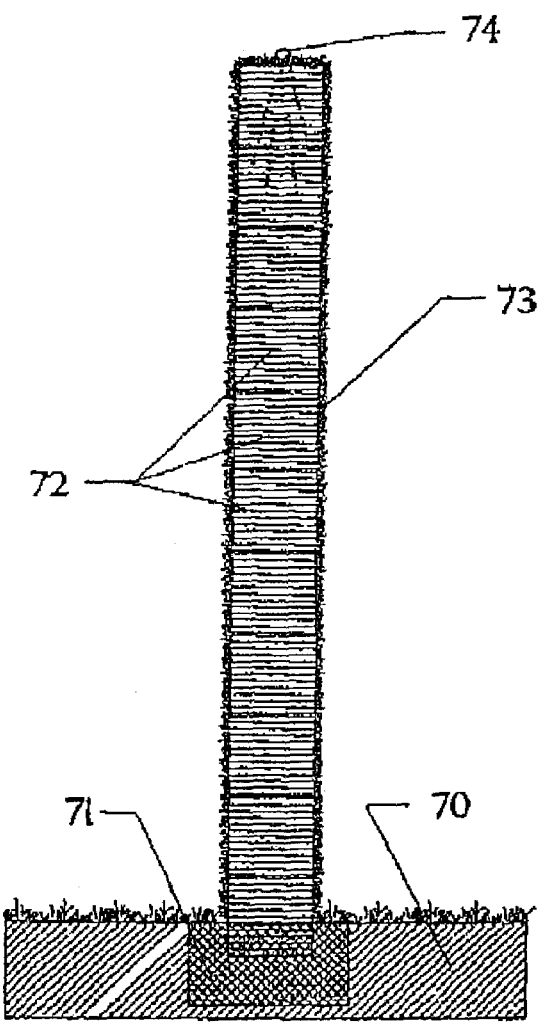
FIG. 19: Shows a cross sectional view of a wall formed using the blocks of FIG. 17.

Referring now to FIGS. 19 to 22 interengaging projections and recesses are not shown, although they could be employed, in the walls shown in FIG. 19 the wall is built upon a concrete foundation 71 formed on ground 70. Blocks 72 are stacked one on top of the other and secured together via any suitable adhesive. The blocks may be secured together utilising an adhesive product, such as a bitumastic material which cures in the atmosphere or glue from a hot glue gun.

In this embodiment the blocks are coated with nutrient and or propagation material such as seeds. Further, an irrigation tube 74 may be provided along the top to irrigate the plants growing on the wall.

The blocks 72 may preferably include a certain amount of paper or other material suitable to retain moisture which provide a suitable medium for the material propagate thereon. Recycled plastics material may provide a suitable porous structure into which the roots of plants may extend to form a natural self supporting structure.

Figure 20:
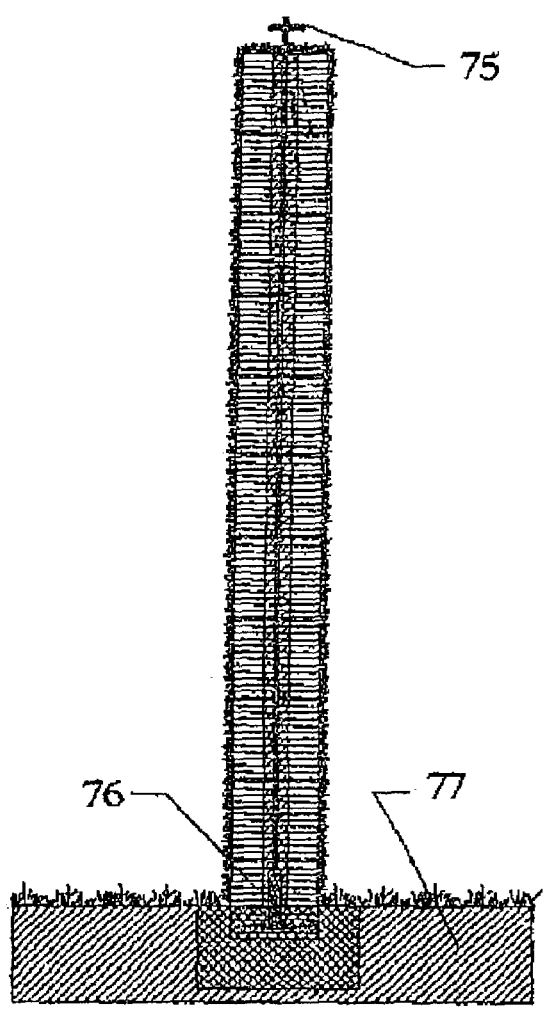
FIG. 20: Shows a cross sectional view of a wall formed using the blocks of FIG. 17 when threaded onto a road.

Referring now to FIG. 20 an alternative embodiment is shown in which a rod 75 preferably formed of steel, extending from a concrete footing 76 is secured in ground 77. A plurality of blocks 72 have longitudinal bores provided therethrough so that blocks 72 may be threaded along a series of poles 75 provided at intervals. The bores in blocks 72 may be formed in an offset manner so that the blocks may be offset between layers.

Figure 21:
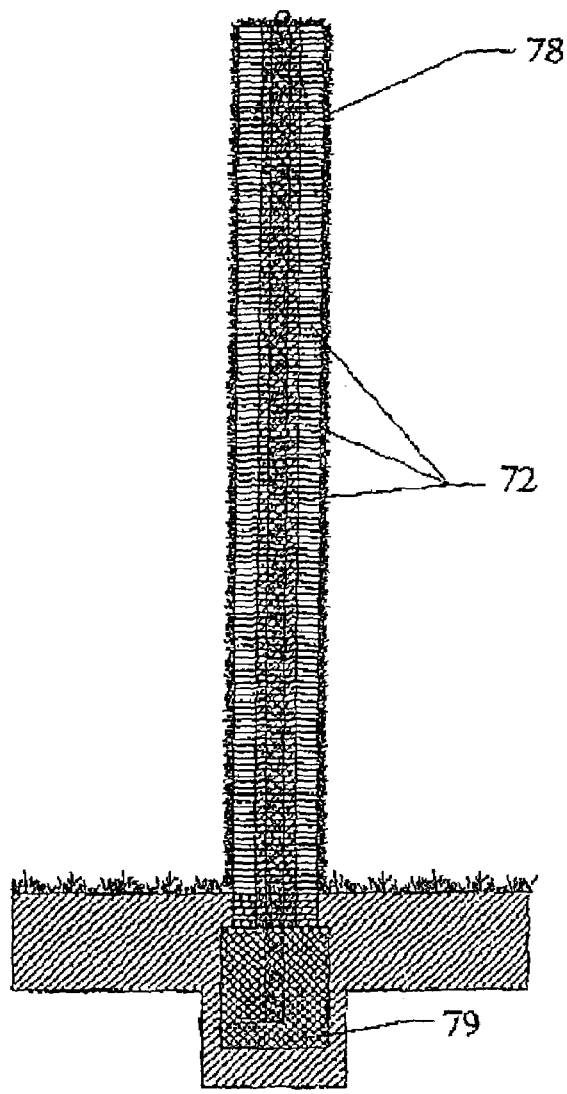
FIG. 21: Shows a cross sectional view of a wall formed using the blocks of FIG. 17 when threaded onto a post.

FIG. 21 shows a similar embodiment in which a wooden post 78 extends from a concrete foundation 79 and a plurality of blocks 72 are threaded on post 78 through apertures formed therein.

Figure 22:
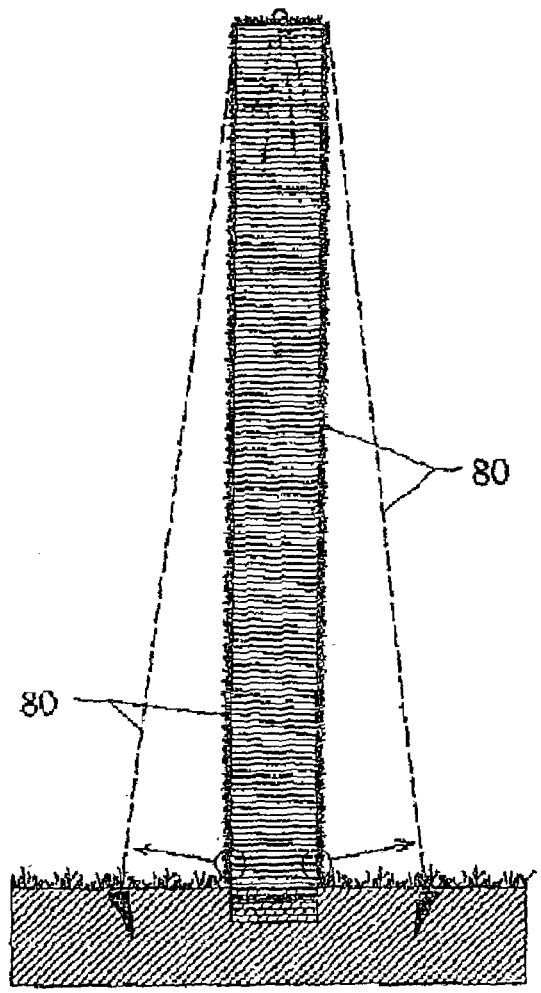
FIG. 22: Shows a cross sectional view of a wall formed using the blocks of FIG. 17 with irrigation means provided.

FIG. 22 shows a wall similar in construction to that shown in FIG. 20 in which bracelines 80 are utillised to stabilise the wall. The bracelines 80 may either extend adjacent blocks 72 or may taper away from the blocks towards the base as shown in the two configurations. Buttresses may also be provided at intervals along any of the above walls to provide additional stability.

It will thus be seen that the present invention provides a method and apparatus for producing articles from plastic waste material suitable for use in construction, insulation, acoustic barriers etc. The method of the invention enables substantially unsorted plastics waste to be processed into viable construction materials. The use of mixed plastics materials without sorting provides significant economies over prior methods. The apparatus of the invention is relatively simple and can be constructed at relatively low cost. The method of the invention allows building materials to be produced economically from plastics waste.

Products formed by the method of the invention have good shock resistance and absorption characteristics making them suitable for use in structures prone to earthquakes or vibration. Products formed by the method of the invention also have good thermal insulation and acoustic isolation properties making them suitable for use in certain building applications. The material also has memory and so can return back to its original shape after deformation.

The present invention is seen as a significant advance in the processing of mixed waste plastics by eliminating the need for sorting plastics into individual plastic types.

What is claimed is:

1. A method of forming an article comprising the steps of:
   i) introducing into a chamber material to be formed containing a sufficient amount of thermoplastics material to bind the material together;
   ii) compressing the material within the chamber in one direction and then in a second direction, transverse to the first direction, so that it occupies a reduced volume;
   iii) inputting sufficient energy to melt sufficient thermoplastics material substantially throughout the material to bind the material together when cooled, and
   iv) releasing an article produced from the chamber.

2. A method as claimed in claim 1 wherein the material is subsequently compressed in a third direction transverse to the first and second directions.

3. A method as claimed in claim 1, wherein superheated steam is supplied to the chamber from a super heated steam source.

4. A method as claimed in claim 3 wherein the superheated steam is supplied through one or more side wall of the chamber.

5. A method as claimed in claim 3 wherein the superheated steam is supplied via tubes supplied with superheated steam having apertures along their length which are inserted into the chamber in step iii.

6. A method as claimed in claim 1 wherein fluid within the chamber is heated by a microwave energy source to generate steam.

7. A method as claimed in claim 6 wherein water is injected into the chamber before microwave energy is supplied.

8. A method as claimed in claim 1 wherein the material is shredded prior to being placed within the chamber.

9. A method as claimed in claim 8 where the material is shredded into strips of about 10 to 20 mm in width.

10. A method as claim in claim 1 wherein the thermoplastics material is waste plastics.

11. A method as claimed in claim 10 wherein the thermoplastics material is a mixture of different types of waste plastics.

12. A method as claimed in claim 10 wherein the thermoplastics material includes PETE and/or polyethylene.

13. A method as claimed in claim 10 wherein the other material to be formed includes at least one of sawdust, wood chips, fibres and papers.

14. A method as claimed in claim 1 wherein the article is cooled by introducing liquid to the chamber prior to release of the article in step iv.

15. A method as claimed in claim 1 where the article is cooled by introducing air to the chamber prior to release of the article in step iv.

16. A method as claimed in claim 1 wherein the article is cooled by releasing it from the chamber into a fluid bath.

17. A method of forming an article comprising the steps of:
   i) introducing into a chamber material to be formed containing a sufficient amount of thermoplastic material to bind the material together;

ii) compressing the material within the chamber so that it occupies a reduced volume;

iii) introducing sufficient superheated steam into the chamber to melt sufficient thermoplastics material substantially throughout the material to bind the material together when cooled; and iv) releasing an article produced from the chamber.

18. A method as claimed in claim 17 wherein the material is compressed in one direction and then in a second direction transverse to the first direction.

19. A method as claimed in claim 18 wherein the material is subsequently compressed in a third direction transverse to the first and second directions.

20. A method as claimed in claim 17 wherein the material is shredded prior to being supplied to the chamber.

21. A method as claimed in claim 20 wherein the material is shredded into strips of about 10 to 20 mm in width.

22. A method as claimed in claim 21 wherein the strips are shredded so as to have rough edges which interlock when compressed.

23. A method as claimed in claim 20 wherein the shredded material is washed and dried prior to being supplied to the chamber.

24. A method as claimed in claim 17 wherein the thermoplastics material is waste plastics.

25. A method as claimed in claim 24 wherein the thermoplastics material is a mixture of different types of waste plastics.

26. A method as claimed in claim 24 wherein the thermoplastics material includes PETE and/or polyethylene.

27. A method as claimed in claim 24 wherein the material to be formed includes at least one of sawdust, wood chip, fiber and paper.

28. A method as claimed in claim 17 wherein the article is cooled by supplying cooling fluid to the chamber prior to releasing the article from the chamber.

29. A method as claimed in claim 17 wherein the article is cooled by introducing air into the chamber prior to releasing the article from the chamber.

30. A method as claimed in claim 17 wherein the article is cooled by releasing it from the chamber into a fluid bath.

31. A method as claimed in claim 17 wherein the superheated steam is supplied to the chamber via openings provided in one or more side wall of the chamber.

32. A method as claimed in claim 17 wherein the superheated steam is supplied by inserting tubes into the chamber having apertures along their length for delivering superheated steam into the chamber at locations such as to ensure sufficient thermoplastics materials is melted throughout the article to bind the article together when it cools.

33. A method as claimed in claim 17 wherein superheated steam at a temperature between 200° C. to 400° C. is supplied to the chamber in step iii.

34. A method as claimed in claim 33 wherein the superheated steam is at a temperature of between 260° C. to 320° C.

35. A method as claimed in claim 33 wherein the superheated steam is at a temperature between 280° C. to 300° C.

36. A method as claimed in claim 1 wherein a pressure of between 5 psi to 100 psi is maintained within the chamber during step iii.

37. A method as claimed in claim 36 where the pressure is maintained at between 5 to 60 psi.

38. A method as claimed in claim 36 when the pressure is maintained at between 10 to 20 psi.

39. A method as claimed in claim 17 wherein superheated steam is supplied into the chamber in step iii for a period of between 10 seconds to 5 minutes.

40. A method as claimed in claim 39 wherein the period is between 10 to 60 seconds.

41. A method as claimed in claim 39 wherein the period is between 10 to 20 seconds.

42. A method as claimed in claim 17 wherein superheated steam at a temperature of between 260° C. to 320° C. is supplied to the chamber for a period of between 10 to 20 seconds at a pressure of between 5 to 25 psi.

43. A method as claimed in claim 17 wherein superheated steam at a temperature of about 300° C. is supplied to the chamber for a period of about 15 seconds at a pressure of between 5 to 25 psi.

44. A method as claimed in claim 17 wherein superheated steam at a temperature of about 300° C. is supplied into the chamber for a period of between 10 to 15 seconds and a pressure of about 15 psi is maintained in the chamber.

45. A method as claimed in claim 1 wherein the material is reduced in volume by a factor of between 5:1 to 25:1.

46. A method as claimed in claim 45 wherein the material is reduced in volume by a factor of between 10:1 to 20:1.

47. A method as claimed claim 1 wherein the material includes up to 20% of material that is not thermoplastic material.

48. A method as claimed in claim 1 wherein the material includes up to 10% of material that is not thermoplastic material.

49. A method as claimed in claim 2 wherein the material is compressed by substantially the same amount in each direction of compression.

* * * * *